(12) United States Patent
Wargon

(10) Patent No.: US 7,460,982 B2
(45) Date of Patent: Dec. 2, 2008

(54) APPARATUS AND METHOD FOR PRODUCING A NUMERIC DISPLAY CORRESPONDING TO THE VOLUME OF A SELECTED SEGMENT OF AN ITEM

(76) Inventor: Kenneth Wargon, 85 Raglan St., Manly NSW 2095 (AU)

( * ) Notice: Subject to any disclaimer, the term of this patent is extended or adjusted under 35 U.S.C. 154(b) by 0 days.

(21) Appl. No.: 11/369,412

(22) Filed: Mar. 7, 2006

(65) Prior Publication Data

US 2006/0155509 A1    Jul. 13, 2006

Related U.S. Application Data

(60) Division of application No. 11/142,626, filed on Jun. 1, 2005, now Pat. No. 7,010,457, which is a continuation-in-part of application No. 10/744,059, filed on Dec. 23, 2003, and a continuation-in-part of application No. PCT/US03/41365, filed on Dec. 23, 2003.

(60) Provisional application No. 60/577,652, filed on Jun. 7, 2004, provisional application No. 60/576,229, filed on Jun. 2, 2004, provisional application No. 60/250,812, filed on Nov. 17, 2003, provisional application No. 60/498,639, filed on Aug. 29, 2003, provisional application No. 60/453,816, filed on Mar. 11, 2003, provisional application No. 60/440,801, filed on Jan. 16, 2003.

(51) Int. Cl.
*G01B 11/28* (2006.01)

(52) U.S. Cl. .......................... 702/156; 83/360; 83/452; 83/149

(58) Field of Classification Search .................. 702/156

See application file for complete search history.

(56) References Cited

U.S. PATENT DOCUMENTS 3,588,480 A    6/1971    Unger (Continued)

OTHER PUBLICATIONS

Horowitz and Hill, "The Art of Electronics", 1989, Cambridge University Press, pp. 590-595.*

(Continued)

*Primary Examiner*—John E. Barlow, Jr.
*Assistant Examiner*—Stephen J Cherry
(74) *Attorney, Agent, or Firm*—John R. Benefiel

(57) ABSTRACT

An apparatus and method for displaying the weight or cost of an uncut selected segment of an item involves passing a position indicating member over the item lying on a support surface. The position indicating member carries one or more sensors which generate signals corresponding to succeeding cross sectional contours of the item as the member is traversed along the item from a reference position to a selected other position over this item, defining the selected segment of the item. At the same time, a motion detector arrangement preferably comprised of one or more microelectromechanical (MEMS) accelerometer devices generates signals corresponding to motion of the position indicator support member as it is moved along the item. These signals are processed in a signal processor to determine the volume of the uncut selected segment of the item lying between selected successive positions of the indication member. Each of these cumulative volume determinations are converted into numeric weight or price values based on the density factor for the particular type of item, whereby numeric weight and price values (based on weight) are displayed as the member is traversed along the item, thus enabling the operator to contemporaneously provide an on-looking consumer weight or price information before a particular segment is cut from the item. A visible light band is projected from the sensor bar onto a section of the item to clearly show the selected segment bounds corresponding to the numeric display to the onlooker.

6 Claims, 10 Drawing Sheets

U.S. PATENT DOCUMENTS

| | | | |
|---|---|---|---|
| 3,762,257 A | 10/1973 | Matthews, Jr. | |
| 3,851,720 A | 12/1974 | Williams, Jr. | |
| 4,156,367 A | 5/1979 | Pardo et al. | |
| 4,512,192 A | 4/1985 | Peters | |
| 4,557,019 A | 12/1985 | Van Devanter et al. | |
| 4,598,618 A | 7/1986 | Kuchler | |
| 4,699,006 A | 10/1987 | Boxenhorn | |
| 4,703,443 A | 10/1987 | Moriyasu | |
| 4,726,094 A | 2/1988 | Braeger | |
| 4,773,029 A | 9/1988 | Claesson et al. | |
| 4,868,951 A | 9/1989 | Akesson et al. | |
| 4,875,254 A | 10/1989 | Rudy et al. | |
| 4,901,253 A | 2/1990 | Iwano et al. | |
| 4,945,765 A | 8/1990 | Roszhart | |
| 4,962,568 A | 10/1990 | Rudy et al. | |
| 5,006,487 A | 4/1991 | Stokes | |
| 5,054,345 A | 10/1991 | Weber | |
| RE33,851 E | 3/1992 | Rudy et al. | |
| RE33,904 E | 4/1992 | Rudy et al. | |
| 5,142,160 A | 8/1992 | Storbeck | |
| 5,163,865 A | 11/1992 | Smith | |
| 5,184,733 A | 2/1993 | Arnarson et al. | |
| 5,202,740 A | 4/1993 | Kivits | |
| 5,226,334 A | 7/1993 | Pegoraro | |
| 5,359,511 A | 10/1994 | Schroeder et al. | |
| 5,392,650 A | 2/1995 | Stinger et al. | |
| 5,422,861 A | 6/1995 | Stringer et al. | |
| 5,499,194 A | 3/1996 | Prestidge et al. | |
| 5,739,426 A * | 4/1998 | Storm | 73/149 |
| 5,937,080 A | 8/1999 | Vogeley, Jr. et al. | |
| 6,125,338 A | 9/2000 | Brienza et al. | |
| 6,164,174 A | 12/2000 | Sigurdsson et al. | |
| 6,407,818 B1 | 6/2002 | Whitehouse | |
| 6,700,563 B1 | 3/2004 | Koizumi | |
| 6,701,279 B1 | 3/2004 | Hawes | |
| 6,813,585 B2 | 11/2004 | Leutz et al. | |
| 7,010,457 B2 | 3/2006 | Wargon | |
| 7,158,915 B2 | 1/2007 | Wargon | |
| 2002/0148130 A1 | 10/2002 | Ohtsuka | |
| 2004/0211258 A1 | 10/2004 | Gene | |

OTHER PUBLICATIONS

Seungbae Lee, Gi-Joon Nam, Junseok Chase, and Hanseup Kim, Design of Padless Mouse System with MEMS Accelerometers and Analog Read-Out Circuitry, Department of EECS, University of Michigan, Ann Arbor, MI 48109-2122.

MEMSense Press Release, http://www.prweb.com/releases/2004/7/prweb142179.htm, PRWeb The Free Wire Service.

European Supplemental Search Report.

Horowitz and Hill, The Art of Electronics 1989, Cambridge University Press.

* cited by examiner

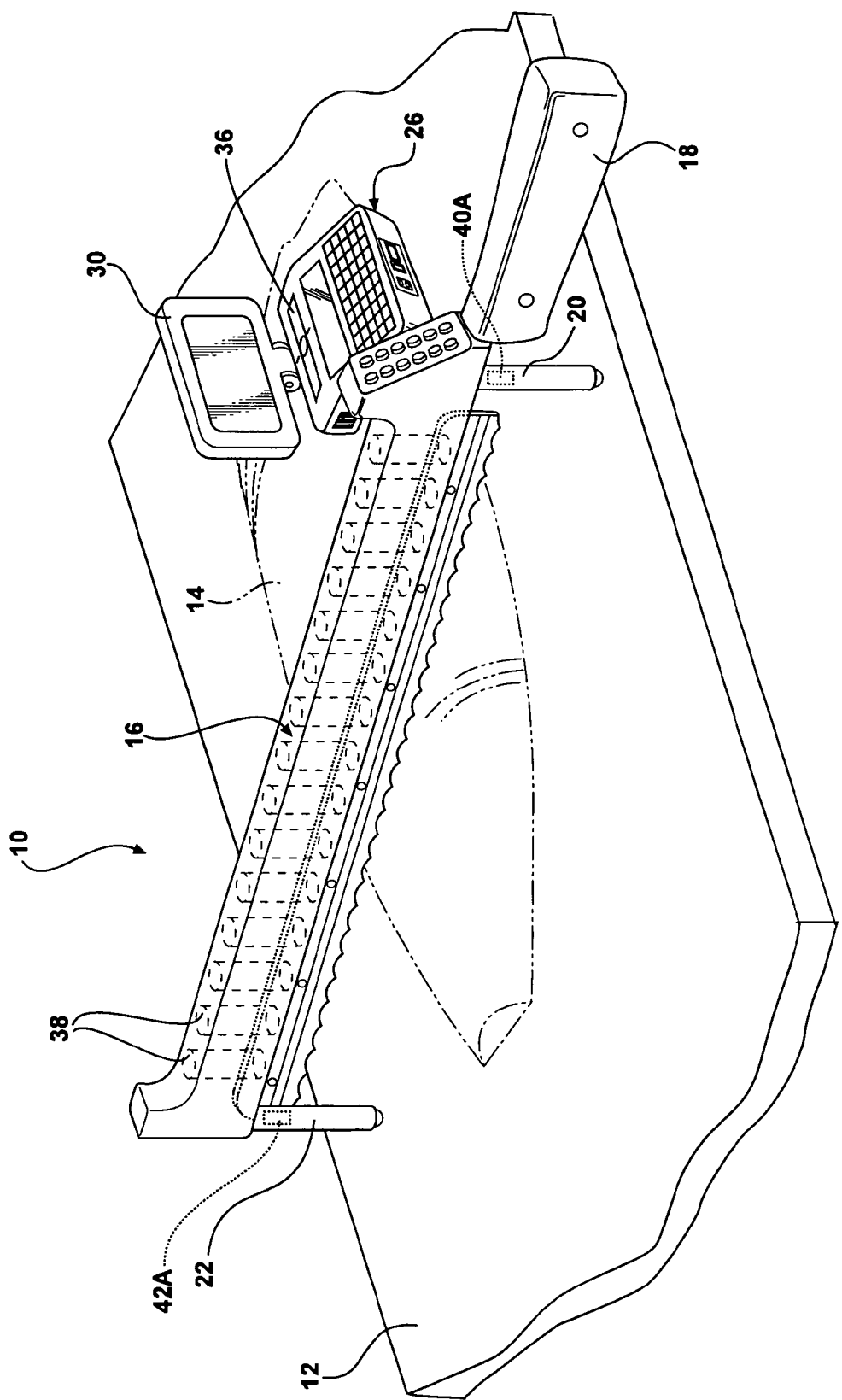

APPARATUS AND METHOD FOR PRODUCING A NUMERIC DISPLAY CORRESPONDING TO THE VOLUME OF A SELECTED SEGMENT OF AN ITEM

CROSS REFERENCE TO RELATED APPLICATIONS

This application is a divisional of U.S. Ser. No. 11/142,626, filed Jun. 1, 2005, now U.S. Pat. No. 7,010,457, which is a continuation-in-part of U.S. utility application U.S. Ser. No. 10/744,059, filed Dec. 23, 2003, which claims benefit of U.S. provisional application Ser. No. 60/576,229, filed Jun. 2, 2004 and of U.S. provisional application Ser. No. 60/577,652, filed Jun. 7, 2004, and is a continuation-in-part of PCT Application No. PCT/US03/41365, filed on Dec. 23, 2003 which claims benefit of U.S. provisional application Ser. No. 60/440,801, filed Jan. 16, 2003, and claims benefit of U.S. provisional application Ser. No. 60/453,816, filed Mar. 11, 2003, and claims benefit of U.S. provisional application Ser. No. 60/498,639, filed Aug. 29, 2003, and claims benefit of U.S. provisional application Ser. No. 60/520,812, filed Nov. 17, 2003.

BACKGROUND OF THE INVENTION

The present application and the prior applications referenced above are concerned with apparatus and methodology for aiding in portioning an item. This needs to be done for example in accurately portioning an irregularly shaped fish fillet or meat cut to a weight or price desired by a customer at the point of sale in a retail market.

In the apparatus and method described in the co-pending U.S. application Ser. No. 10/744,059, a sensor arrangement support is positioned above an item over a first reference section and then moved to a position over a second selected section, the portion between the two sections comprising a selected segment of the item. Various contour sensing arrangements and displacement detector devices are described to generate signals corresponding to the extent and direction of travel of the support in moving to the second section as well as to the cross sectional contours of sections of the item along the selected segment. From the signals of the displacement detector and contour sensor devices, the volume of any segment of the item is computed and a corresponding numeric value (weight or price) is displayed for viewing by the customer and the server. This provides a convenient way of displaying the weight or price of any segment of the item defined between any two sections of the item. The item can therefore be cut so as to provide any desired portioning of the item and this portion will be of an accurately known weight or price prior to being cut.

The aforementioned co-pending patent application describes a wide variety of contour sensor arrangements including an array of mechanical plungers or an inline series of non-contacting sensors, such as sonic or optical sensors.

Some of the various sensors described therein are relatively costly and/or not ideally suited to environments in which the apparatus is contemplated as being used, i.e., where contact of the apparatus with foods will inevitably occur, and where the equipment must be regularly cleaned thoroughly. Also, abuse of the equipment must be expected when unskilled personnel operate the same, particularly in a rushed atmosphere and delicate sensors might not be able to function well over a reasonable service life or need frequent repair or adjustment.

It is the object of the present invention to provide an apparatus and method of the above described type in which improved devices are used to determine displacements which are low in cost, rugged and reliable, and yet provides very accurate determination of the extent and direction of displacement of various components of the apparatus.

SUMMARY OF THE INVENTION

The above object and other objects which will be understood upon a reading of the following specification and claims are achieved by incorporating motion detectors into the apparatus of the type described in the cross referenced co-pending patent application to generate signals corresponding to the direction and extent of displacement of various components used to determine the volume of segments of an item of interest and to simplify and improve the serviceability of this apparatus.

In addition, where an arrangement of extendable plungers is utilized to generate signals corresponding to the cross sectional contours of the item or to mark or score an item, the extent of such plunger motion may be detected by such motion detectors.

The motion detectors are preferably accelerometers and of the microelectromechanical or "MEMS" type which are now very well known and in wide spread use in various applications. Various terms and acronyms are used to describe the technology of such miniature (or ultra-miniature) devices. Terms often used include MST (Micro Structure Technology), microstructures, microsystems, and mechatronics. Although definitions vary, the term MEMS may be defined as micro-electromechanical systems comprised of moving parts smaller than a human hair that contain both electrical and mechanical components on a silicon chip. The term "MEMS accelerometers" or the equivalently meaning "MEMS based accelerometers" will be used predominately throughout this specification. These terms will be employed in this specification as a general term applying to various types of technologies whereupon small scale accelerometers are based, without implying that all of such devices are based on micro electromechanical principles. These devices are often comprised of miniature accelerometers which are designed in accordance with a variety of principles to detect slight motions of a "proof mass", such as by detecting capacitance changes, piezoelectric signals, or tunneling currents.

Another type of miniature accelerometer utilizes relative movement of a moveable microcomb suspended over a fixed microcomb, relative movement therebetween induced by motion of the structure to be monitored. An optical motion signal is created by interference effects between the microcombs.

Although one accelerometer enables the determination of the extent and direction of motion along one axis, a plurality of such accelerometers can detect acceleration along more than one orthogonal axes, and can be combined together in a single device capable of detecting motion along two or more axes to determine the extent and direction of displacement, tilt, or lifting of a sensor arrangement support member.

BRIEF DESCRIPTION OF THE DRAWINGS

FIG. 1A is a pictorial view of a sensor bar shown in FIG. 1 with motion detectors at first alternate locations thereon.

DETAILED DESCRIPTION

In the following detailed description, certain specific terminology will be employed for the sake of clarity and a particular embodiment described in accordance with the requirements of 35 USC 112, but it is to be understood that the same is not intended to be limiting and should not be so construed inasmuch as the invention is capable of taking many forms and variations within the scope of the appended claims.

Figure 1:
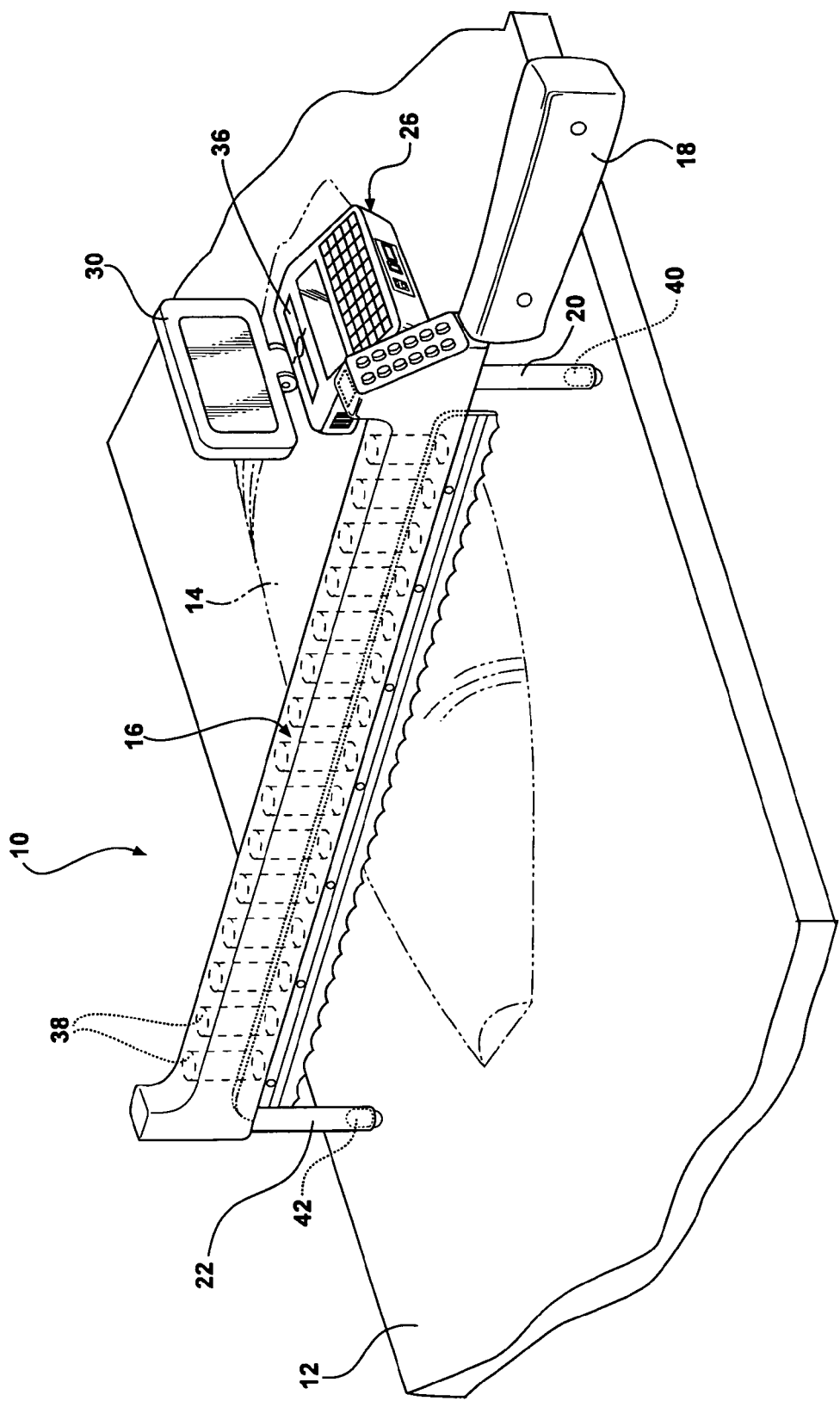
FIG. 1 is a pictorial view of an apparatus according to the present invention.

Referring to FIG. 1, the apparatus 10 according to a first embodiment of the invention includes a contour sensor arrangement supported by a support member, here shown as comprised of an elongated sensor bar 16 which mounts a series of height or thickness sensors 38 extending along the length of the sensor bar 16. Sensor bar support posts 20, 22 are provided at each end of the manually movable sensor bar 16, a handle 18 provided at one end to enable convenient manual movement by a user. The posts 20, 22 locate the sensor bar 16 at a predetermined height above a support surface defined by a table 12.

A motion detector arrangement is provided to generate signals corresponding to the extent and direction of motion of the sensor bar 16, during manual stroking of the sensor bar 16 over the surface of the table 12 and along an item 14 to be portioned resting on the table 12. In this embodiment, the motion detector arrangement includes motion detectors 40, 42 located at the bottom end of each support post 20, 22, respectively.

As described in the cross referenced co-pending application, a contour sensing arrangement comprised of a linear series of height sensors 38 installed extending along the length of the sensor bar 16 which produce signals corresponding to the height of the upper surface of the item 14 above the support surface defined by the table 12 at points along the cross section of the item 14 aligned with the sensor bar 16. Alternatively, sensors 38 may sense the thickness of the item 14 at points along the section of the item lying below the sensor bar 16, as described in the co-pending cross-referenced application. This contour sensor arrangement generates signals corresponding to the cross sectional contour of the item 14 at each section lying below and aligned with the sensor bar 16 at successive positions thereof along the item 14.

The height or thickness sensors 38 can be of various types, as described in detail in the cross-referenced co-pending application, such as optical or sonic sensors emitting and receiving light or sound waves respectively and receiving reflections thereof from the item 14, or penetrating the item 14 and reflecting from the surface of the table 12.

Figure 2:
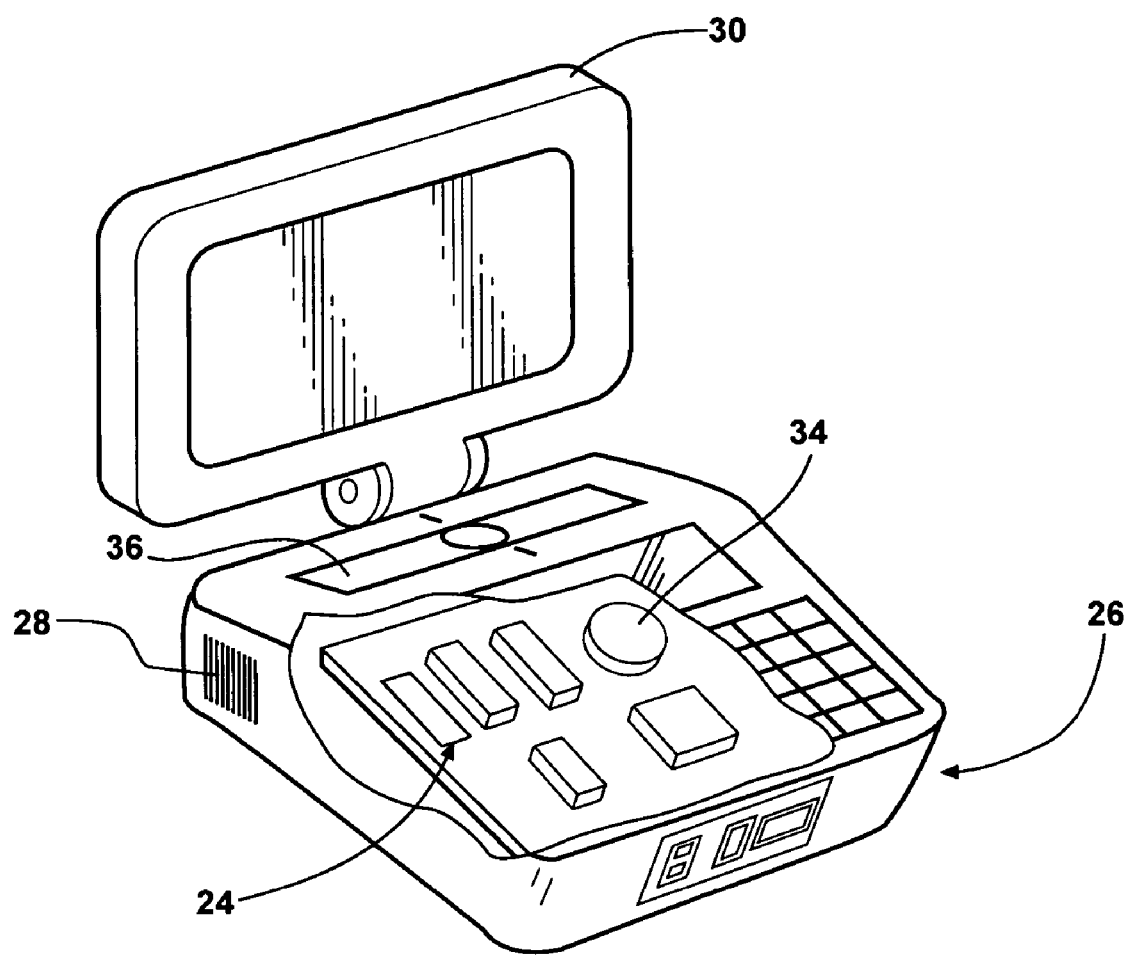
FIG. 2 is an enlarged pictorial view of an instrumentation casing including a display and signal processing electronics included in the apparatus shown in FIG. 1.

The motion detector and sensor arrangement signals are transmitted to a signal processor 24 which may be a programmable microprocessor contained in a casing 26 as shown in FIG. 2, which computes the total volume of the selected segment of the item 14 from the motion detector and contour sensor arrangement signals. This calculated volume is converted into a corresponding numeric value, usually the weight or a price based on the weight of a selected segment of the item 14. This numeric value is displayed substantially contemporaneously in an upright display 30 which may be mounted to the casing 26 as shown in FIGS. 1 and 2.

The motion detectors 40, 42 each generate electronic signals corresponding to the direction and extent of horizontal motion of the bottom end of each support post 20, 22 respectively as the sensor bar 16 is moved in either direction along the item 14 from a starting or reference position over any selected section of an item 14 to be portioned to reach a position over another selected section of said item 14. As the sensor bar 16 is moved along the item 14 on the table surface 12, the bottom end of each support post 20, 22 is intended to be kept in constant contact with the surface of the table 12.

According to the present invention, the signals generated by each of the motion detectors 40, 42 are processed to determine the displacement and direction of displacement of the bottom of each post 20, 22 respectively. The motion detectors 40, 42 are each preferably comprised of accelerometers included therein, and preferably of accelerometers of a type known as "MEMS" (Micro Electro-Mechanical Systems) accelerometers.

MEMS accelerometers may be based on various designs and sensing methods some of which are described in an article titled "Design of Padless Mouse System with MEMS Accelerometers and Analog Read-Out Circuitry" (by Seungbae Lee, Gi-Joon Nam, Junseok Chae, and Hanseup Kim, Department of EECS, University of Michigan, USA). This article discusses some MEMS accelerometer sensing technologies including piezoelectric, tunneling, and capacitive. Other technologies include (but are not limited to) strain gauge sensing. This article is hereby incorporated by reference into this application in its entirety.

MEMS accelerometer devices are well known and are also described in U.S. published application 2004/0211258, and U.S. Pat. Nos. 5,392,650; 5,006,487; 4,945,765; 4,699,006; and 4,512,192, also incorporated herein by reference.

As described in the referenced article, the use of two such MEMS accelerometers mounted orthogonally to each other enables the determination of the positions in a plane of a member that is moved over a 2-dimensional flat surface. Also, as described, the use of three orthogonally arranged MEMS accelerometers enables the determination of the positions in space of a member that is moved about in that space. Thus, in a three dimensional implementation, if a member that is moved over a flat surface is lifted off the flat surface or tilted, the three axis arrangement of MEMS accelerometers will enable detection of that occurrence.

Each of the motion detectors 40, 42 associated with the respective sensor bar support posts 20, 22 may consist of an orthogonal arrangement of two MEMS accelerometers that enables the sensing of the accelerations of the respective sensor bar support posts 20, 22 about two orthogonal axes as the sensor bar 16 traverses the table 12 with the support posts 20, 22 staying in constant contact with the surface of the table 12. The corresponding generated signals are communicated to and processed by a signal processor 24 to derive signals corresponding to displacements of the end of each sensor bar support post 20, 22 as the sensor bar 16 is moved along the item 14.

An orthogonally arranged cluster of three MEMS accelerometers may also be employed as motion detectors 40, 42 that are associated with the respective sensor bar support posts 20, 22. The use of three clustered MEMS accelerometers enables the detection of three axes of acceleration of the lower free end of each of the respective sensor bar support posts 20, 22 as the sensor bar 16 is moved along and above the item 14. The detector signals are communicated to and processed by the signal processor 24 to determine the displacements of the end of each sensor bar support post 20, 22 as the sensor bar 16 is moved along the item 14 on the table surface 12. The resultant ability to detect vertical axis accelerations allows detection of lift off of one or both of the sensor bar support posts 20, 22 from the surface of the table 12 such as when an operator inadvertently lifts one or both of the support posts off the table 12 when passing the sensor bar 16 over the item 14. An audible alarm 28 (FIG. 2) in the display case 26 may be sounded when this occurs, thus alerting the operator of the need to start over in scanning the item 14 in order to ensure accurate results. The use of a single axis MEMS accelerometer aligned to sense vertical movement of the sensor bar 16 may also accomplish this same purpose.

Figure 1B:
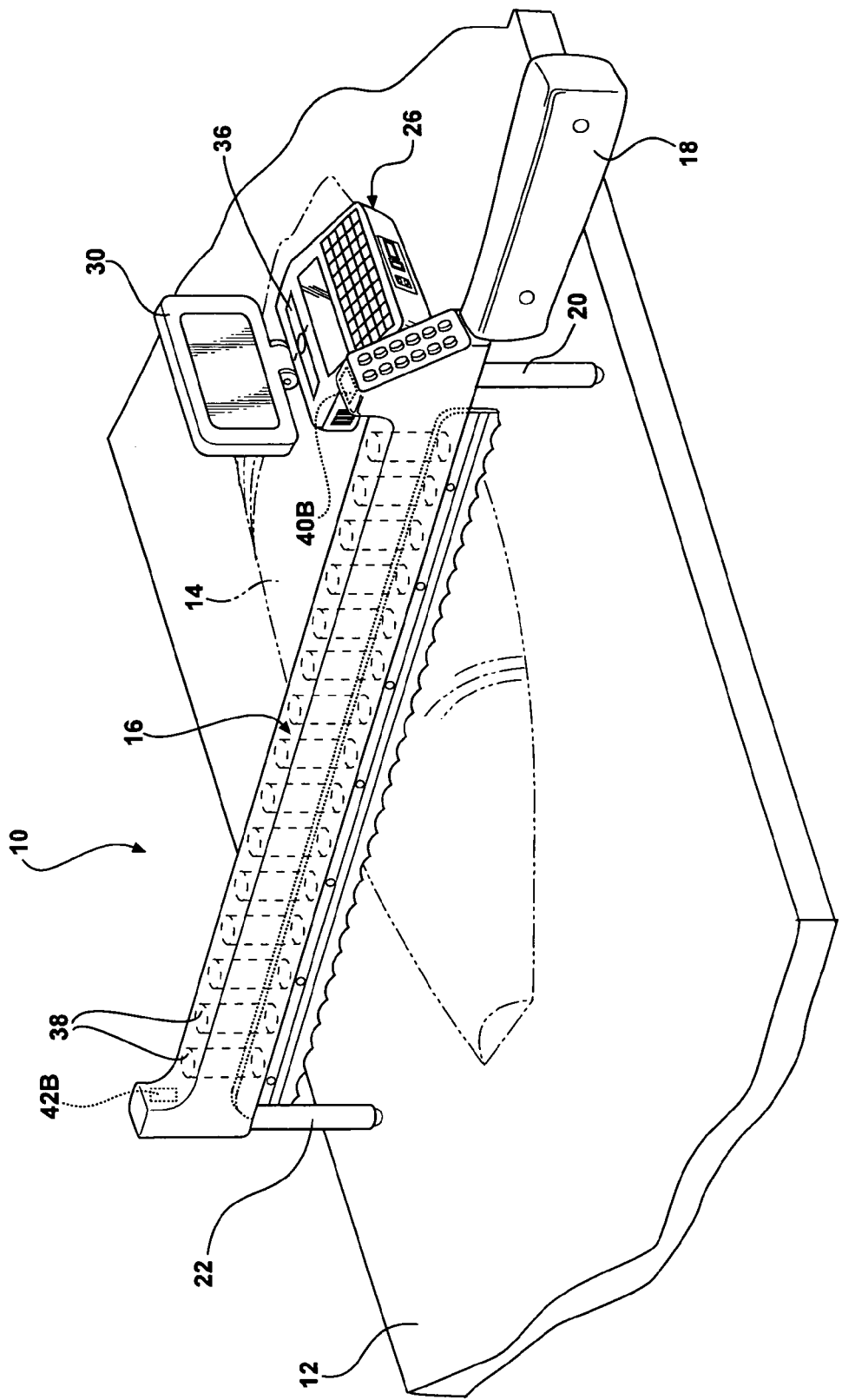
FIG. 1B is a pictorial view of a sensor bar shown in FIG. 1 with motion detectors at second alternate locations thereon.

The sensor bar 16 and support posts 20, 22 should be consistently held in a substantially vertical orientation. The determination of the support post motion in three axes may be utilized to detect tilting of the sensor bar 16. For this determination, alternative higher locations of the motion detectors 40A, 42A (as exemplified in FIG. 1A) or 40B, 42B (as exemplified in FIG. 1B), are preferred, as an out-of-plumb sensor bar 16 position would usually cause a greater sensor bar vertical axis positional change at the top of the support posts 20, 22 or the sensor bar 16 itself than at the bottom thereof. Thus slight tilting will be more easily detectable.

An out-of-plumb alarm or indicator 34 (FIG. 2) in the case 26 may be triggered responsive to an excessive tilted orientation of the sensor bar 16 as detected by the motion detectors, 40A, 42A, 40B, 42B. This arrangement also supplements or could eliminate the need for a separate spirit level 36 (FIG. 2) or other tilt indicator.

The orientation of the sensor bar 16 may also be used to mathematically compensate when calculating the weight or price of a selected segment of the item 14 when the sensor bar 16 is tilted, instead of merely activating a tilt alarm 34.

Thus, the preferred MEMS based accelerometers used in the motion detectors 40A, 42A or 40B, 42B are those that are comprised of a three axis cluster of MEMS accelerometers that enables the determination of the orientation of the sensor bar 16 as the sensor bar 16 is traversed over the table surface 12, enables a determination if one or both of the sensor bar support posts 20, 22 has lifted off of the table surface 12, and enables the determination of the extent and direction of motion of each of the support posts 20,22.

The unlimited variety of locations for the MEMS accelerometer based motion detectors enables these detectors to be placed in the most secure/stable locations that are less subject to vibrational, physical, or other stresses, thus avoiding possible false readings or displacement detector damage. Such stresses would often occur at the lower ends of sensor bar support posts 20, 22 as this area is in constant contact with the surface of the table 12 as the sensor bar 16 traverses the surface of the table 12. This versatility in motion detector placement enables a more flexible sensor bar design in order to meet the demands of various applications, manufacturing requirements, or aesthetic requirements.

The use of multiple axis clustered accelerometer versions of MEMS motion detectors 40, 42 enables detection of lift up of one or both of the support posts 20, 22 off the table surface 12 by detecting vertical motion thereof. This offers clear advantages over the displacement detectors described in the above cross referenced parent utility application.

Although optical based displacement detectors described therein can detect a loss of reflected light from the surface of the table 12 due to the lifting of displacement support posts 20, 22 off the surface of the table 12, such loss of reflected light can also result from other conditions such as a dirty or dull finished surface of the table 12.

Although electromagnetic based displacement detectors also described in the parent application may also detect when sensor bar support posts are lifted off of the surface of the table 12 by sensing the absence of magnetic fields, the use of those displacement detectors requires a specialized digitizer tablet type table surface instead of an off-the-shelf conventional cutting board as can be used with the MEMS accelerometer motion detectors 40, 42.

Similarly, although previously described firm-pointed stylus pressure sensitive based displacement detectors may detect when support posts 20, 22 are lifted off the surface of the table 12 by sensing the lack of pressure from the pointed stylus, the use of such displacement detectors requires a specialized pressure sensitive tablet based table surface whereas an off-the-shelf conventional cutting board can be used with the MEMS accelerometer based motion detectors 40, 42.

Alternatively, separate MEMS accelerometer based motion detectors that each contain only a single axis MEMS accelerometer may be placed elsewhere on or in the sensor bar 16, or carried on or in other components on the sensor bar 16 to determine if the sensor bar 16 has moved upwards (indicating one or both of the sensor bar support posts 20, 22 has moved upwards off of the table surface 12).

Figure 3:
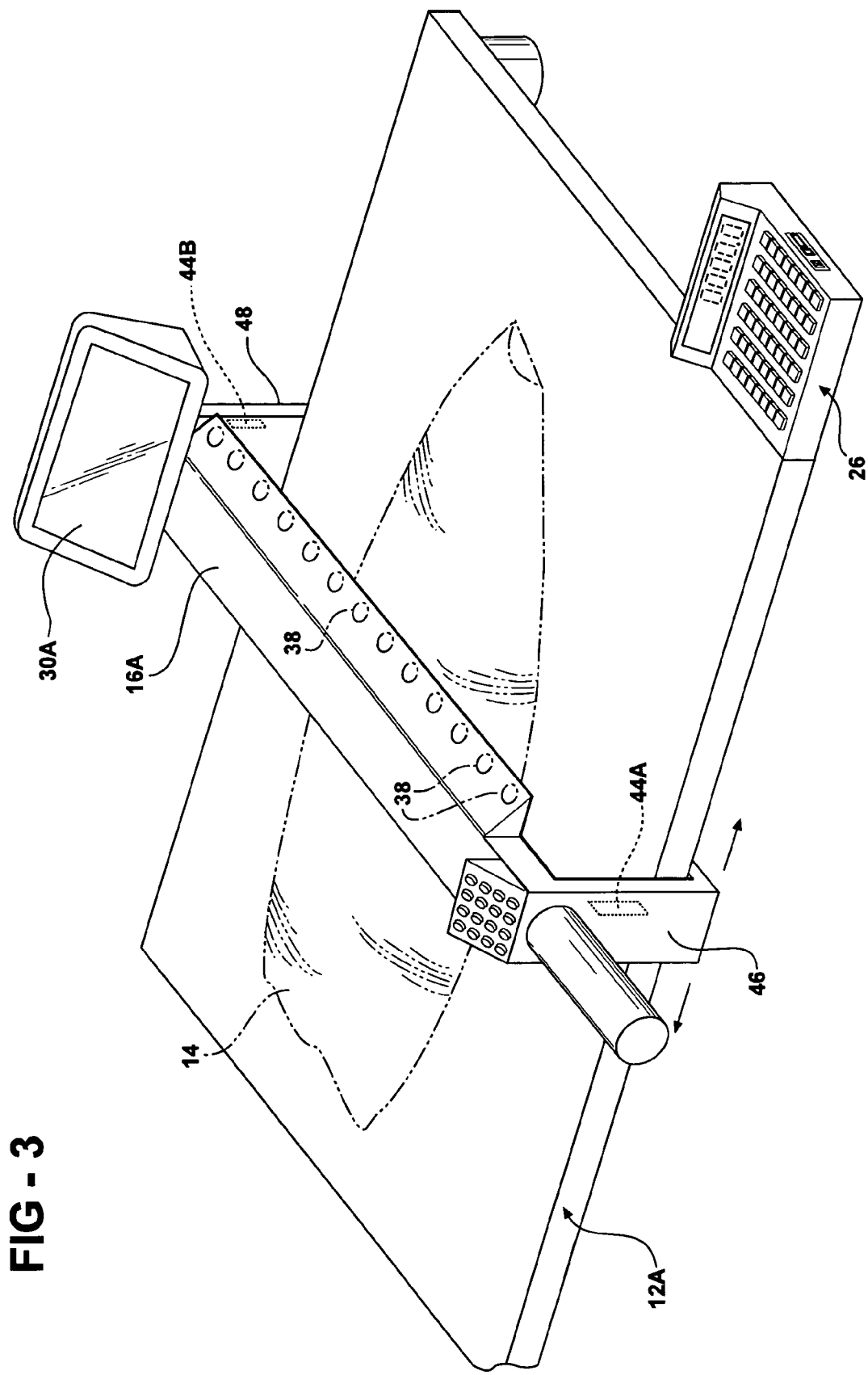
FIG. 3 is a pictorial view of a second embodiment of an apparatus according to the present invention.

MEMS accelerometer based motion detectors may be utilized in all sensor bar configurations such as those described in this application as well as the cross referenced parent application in place of displacement detectors based on other technologies such as optical, optical-mechanical, electromagnetic, pressure-sensitive tactile, etc. For example, the Moiré fringe optical displacement detector described in the parent application may be replaced with one or both of the MEMS accelerometer based motion detectors 44A or 44B as illustrated in FIG. 3. That is, either one or both of motion detectors 44A or 44B may be mounted to respective sides of either upright 46 or 48 as shown in FIG. 3. Alternatively, a single MEMS accelerometer based motion detector 44A, 44B may be mounted to only one of the uprights 46, 48 or to the connected portion of the sensor bar 16A to sense single axis motion only along the direction of constrained movement across the table 12A since the sensor bar 16A is itself constrained to move along a single axis over the table 12A. Both detectors 44A, 44B may be used for the sake of redundancy or to detect skewing caused by bearing wear, etc. The MEMS based accelerometers 44A, 44B are each comprised of a single axis MEMS accelerometer as only the determination of the extent and direction of linear motion is required.

The MEMS accelerometer based motion detectors used to replace other displacement detectors in the cross referenced co-pending application may incorporate either a combination of two orthogonally oriented MEMS based accelerometers to sense movements along two orthogonal axes in the plane of the item support surface or a cluster of three orthogonally oriented MEMS based accelerometers to detect motion along three orthogonal axes in the plane of the item support surface and the space above the support surface.

Each of the MEMS accelerometer based motion detectors 40, 42, 40A, 42A, 40B, 42B, 44A, 44B are preferably encased in a sealed housing isolated from the environment whereby they are not subject to damage by debris, water, dirt, oils, cleaning products, or other contaminants. Furthermore, this sealed environment isolates the MEMS accelerometer based displacement detector from physical damage (e.g., chipping, cracking, scratching, or frictional induced damage) caused by contact with either the table surface 12 or other materials, surfaces, equipment, or utensils and thus can better withstand operator abuse or neglect such as a standard knife or other kitchen utensil may encounter.

MEMS accelerometer based motion detectors 40, 42, 40A, 42A, 40B, 42B, 44A, 44B also do not have any macro moveable components that are subject to macro frictional wear. Furthermore, due to the sealed housings and maintenance free aspect of the MEMS accelerometer based motion detector, the disassembly, removal, or special handling of the motion detectors is not required prior to or during cleaning of the sensor bar 16.

As MEMS accelerometer based motion detectors 40, 42, 44A, 44B do not interact with the surface of the table 12, their operation is independent of the type of table employed as well as the condition of the table surface 12. Hence, acceptable tables may be constructed out of virtually any type of material such as wood, plastic, marble, etc. Acceptable surfaces for the table 12 may also be smooth, rough, reflective, non-reflective, greasy, oily, wet, slippery, dusty, etc. The lower ends of the sensor bar support posts 20, 22 easily maintain constant contact with virtually any table surfaces 12 as they are able to glide on smooth, rough, reflective, non-reflective, greasy, oily, wet, slippery, or dusty surfaces as the sensor bar 16 (or other sensor arrangement support) traverses the table surface 12. These just described surface conditions are common in many situations where for example portioning of fish filets is carried out.

As is fully described in the apparatus described in the cross referenced co-pending application, as the sensor bar 16 (or other sensor arrangement support implementations) traverses the table surface 12, the displacement of the sensor bar 16 is continually determined from the signals generated by the motion detectors 40, 42 employed. Such determinations of displacements are required in order to carry out calculations to determine the volume of a segment and thus the weight or price of any selected segment of the item 14 defined between any two selected sections of the item lying below the sensor bar 16 in two positions thereof as described in the cross referenced co-pending U.S. patent application.

Figure 4:
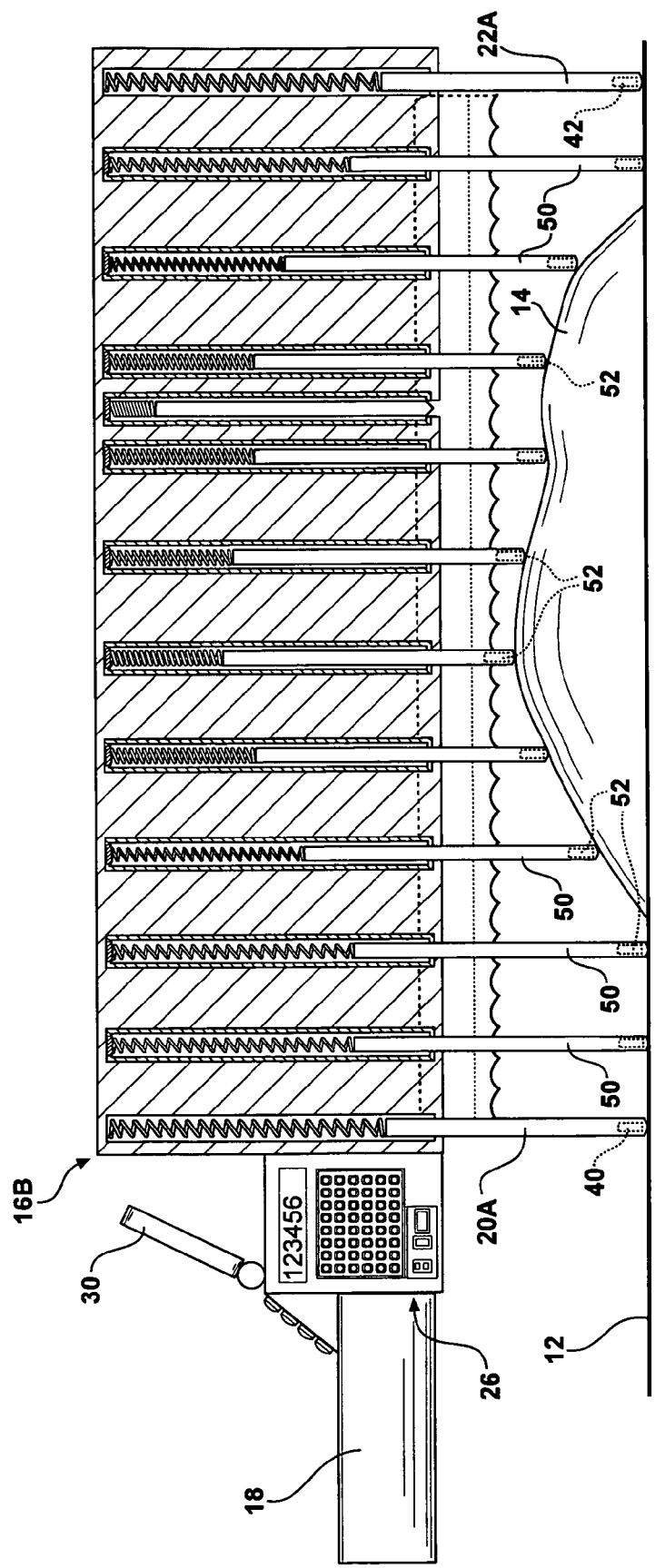
FIG. 4 is a partially sectional view of a third embodiment of an apparatus according to the present invention.

As described in the cross referenced co-pending patent application, a linear displacement sensor based on a photoelectric reflection array may be used to measure the vertical displacement of plungers 50 shown in FIG. 4 which are used as a sensor arrangement for determining the cross sectional contour of successive sections of the item 14, or for marking, scoring, or cutting of the item 14. A linear displacement sensor may also be used to determine when a plunger 50 rests on the top surface of the item 14, or to determine when a plunger 50 has been fully withdrawn into its retracted position inside of the sensor bar 16B. Each such linear displacement sensor based on photoelectric reflection array technology may be replaced with a MEMS accelerometer based linear motion detector that utilizes a single axis MEMS accelerometer, to determine vertical displacements.

Figure 5:
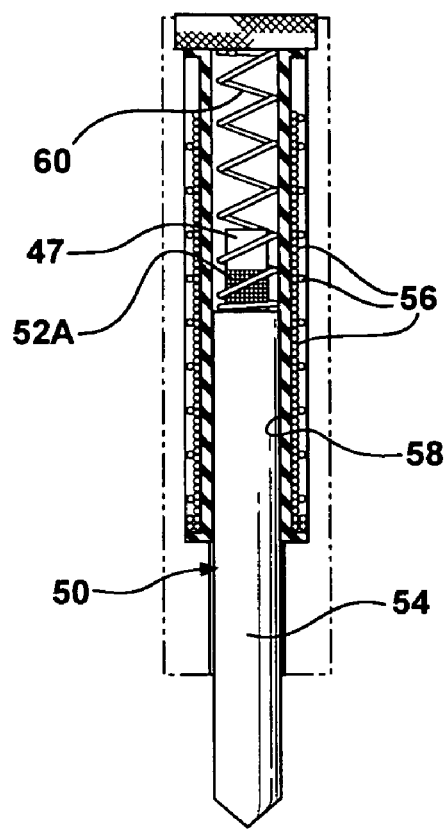
FIG. 5 is an enlarged partially sectional view of one of a plurality of plunger assemblies included in the third embodiment, with an included plunger member shown in an extended position.
Figure 6:
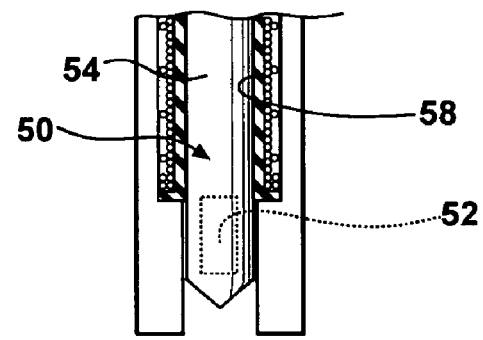
FIG. 6 is a partially sectional view of the plunger assembly shown in FIG. 5 with the plunger member shown in a retracted position.

Each MEMS accelerometer based linear motion sensor detector 52 is shown mounted within the lower end of plunger 50 in FIGS. 4 and 6. Another acceptable location of a MEMS accelerometer based linear motion sensor 52A (FIG. 5) is between the plunger stem 47 and main plunger body 54. Only one of the single axis motion sensors 52, 52A would normally be mounted to each plunger 50.

The use of the MEMS type accelerometers in detectors 52, 52A enables the sensing of the vertical Z axis acceleration of the plunger 50 as the plunger 50 moves up and down (and possibly stops) through the cavity 58 formed by the solenoid coil windings 56. As illustrated in FIGS. 5 and 6, by utilizing MEMS accelerometer based linear motion detectors, 52,52A, the optical components associated therewith described in the cross referenced co-pending application is eliminated, and the plungers 50 may completely occupy the cavity 58 formed by the solenoid coil windings 56. MEMS accelerometer based linear motion detectors 52, 52A also do not require that the springs 60 have a matte finish.

The signals corresponding to the acceleration of the plungers 50 generated by the associated MEMS accelerometer 52, 52A are transmitted to the signal processor 24 (FIG. 2) to compute the relative vertical or Z axis displacement of each plunger 50 as the plunger 50 moves up and down (or stops) within the above described cavity 58. The signal processor 24 contained in case 26 (FIG. 2) processes those signals to calculate the cross sectional contour of the section of the item 14 under the sensor bar 16B, or to determine when a plunger 50 has settled (without movement) onto the top surface of the item 14, or to determine when a plunger 50 has settled (without movement) into its fully retracted position inside of the sensor bar 16B.

As the MEMS accelerometer based linear motion detectors 52, 52A are each contained within or otherwise associated with the plunger 50, the plunger 50 is a one-piece unit which is contained within the cavity 58 formed by solenoid windings 56. This one-piece construction simplifies the construction of the overall plunger assembly. Since the MEMS accelerometer detector 52, 52A of this one-piece unit acts independently of surrounding assemblies or mechanisms, the possibility of misalignment during installation and use is minimal. Furthermore, as exemplified by the location of the detectors 52 or 52A in FIGS. 5 and 6, the MEMS accelerometer motion detectors 52, 52A may be placed in various locations. This provides for flexibility of design and manufacturing and also enables the MEMS accelerometer motion detectors 52 to be placed in areas less subject to physical and vibrational stresses as undergone at locations near the bottom end of plungers 50. Each of the MEMS accelerator based linear motion detectors 52, 52A are preferably encased in a sealed housing isolated from the environment whereby they are not subject to damage by debris, water, dirt, oils, cleaning products, or the other contaminants.

When the position of a sensor bar 16 is used to visually indicate to an observer the sections of the item 14 which define an item segment of interest, it may be desirable to make it easier to see the bounds of the segment of the item as it corresponds to the numeric display. Since the sensor bar 16 may have appreciable thickness and is spaced above the item 14, the exact item section lying directly beneath the sensor arrangement associated with the sensor bar 16 may not be easily ascertained by an onlooker. Similarly, the viewing angle of an observer such as a customer or operator may affect his or her ability to determine the exact location of that section. When plungers 50 are used, this is not a problem, but with non-contact sensors it may be desirable to provide a clearer indication to the observer of the exact item segment corresponding to the display. A more accurate discernment of the segment bounds may be enabled by projecting an elongated pattern, i.e., a narrow band of visible light onto the item 14 extending across the section which contour is being determined from the signals generated by the sensors 38.

Figure 7:
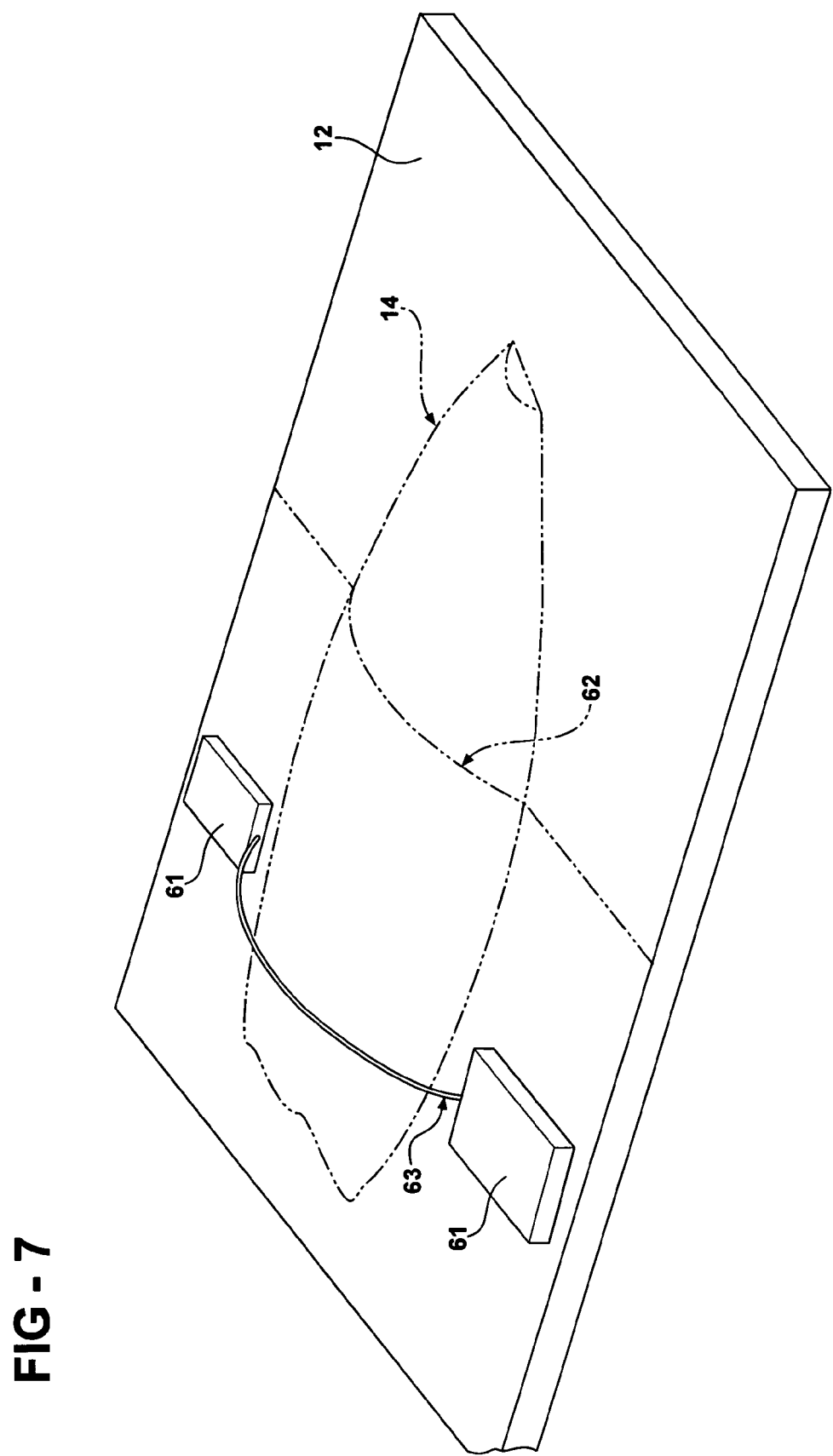
FIG. 7 is a pictorial view of an item in place on a support surface with a reference indicator element in position across one section of the item and a thin light band projected onto another section of the item.
Figure 8:
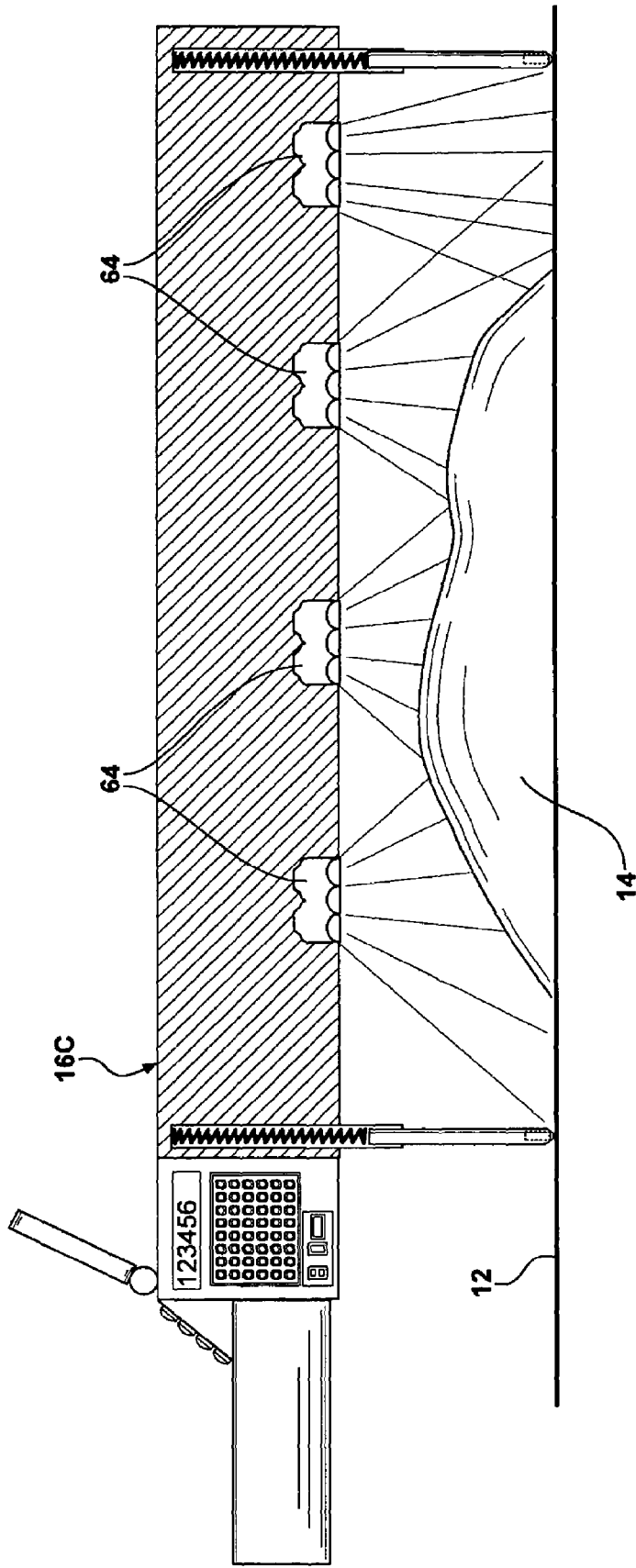
FIG. 8 is a partially sectional view of a sensor bar positioned over an item on a support surface, the sensor bar having a series of visible light emitters mounted on the underside thereof to enable a thin light band to be projected across an item placed below the sensor bar.
Figure 9:
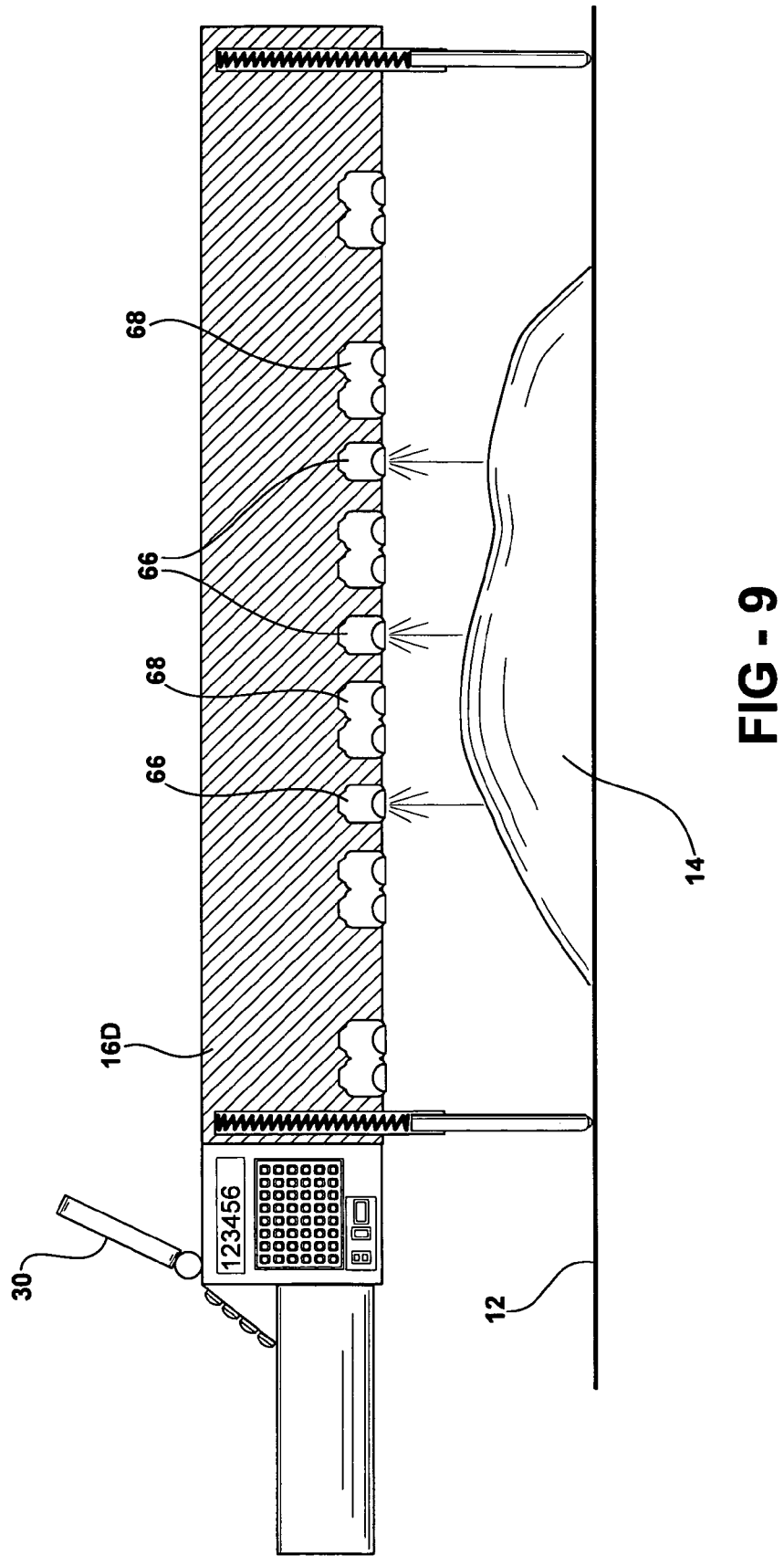
FIG. 9 is a partially sectional view of a sensor bar having interposed visible light emitters located between optical triangulation contour sensors along the underside of a sensor bar.

This is shown in FIG. 7 where a selected start reference section of the item 14 is temporarily indicated by a curved wire marker element 63 positioned on the surface of the table 12 by the weight of attached blocks 61, or by magnetic attraction of magnetized blocks 61 to a magnetic support surface 12. The marker element 63, is placed in alignment with a narrow light band projected from the sensor bar 16 onto item 14 at a start or reference position of the sensor bar 16. The sensor bar 16 is then shifted to a second position where a narrow visible light band 62 is projected to impinge onto the item 14 extending across a section spaced from the start position. The light band is projected from the underside of a sensor bar 16C, 16D (FIGS. 8, 9). The weight or cost of a segment of the item 14 defined between the start section below wire marker element 63 and the offset section at the light band 62 in the second position of the sensor bar 16C, 16D will be numerically shown by display 30. This provides a more readily seen visual indication of the bounds of the particular segment of the item 14 corresponding to the displayed weight or cost."

FIG. 8 shows one arrangement for producing the projected narrow visible light band 62. A series of lamps, visible light emitting diodes or other visible light emitters 64 is mounted along the underside of a sensor bar 16C, suitably masked and focused to project downwardly from the sensor bar 16C the narrow light band 62 aligned with the sensors 38 on the sensor bar 16C so that the light band 62 lies on the same item 14 section which is housing its cross sectional contour determined from the sensor 38 signals. Thus, the numeric value displayed at any time will correspond to the segment bounded on one side by the light band 62. The light band 62 is readily visible on the surface of the item 14 to an observer even if he or she is standing some short distance away. This indication removes any problems with parallax effects and is precise enough to satisfy the interests of the on-looking person being served or the server.

The sensor bar 16C will also mount for example, acoustic, optical or other sensors (not shown) as described in the cross referenced patent application for determining the cross sectional contours of sections of the item 14 in order to enable calculation of volumes of selected segments of the item described therein. The narrow visible light band should be located to be aligned with the item section which is being scanned at that time by the contour sensors 38 in order to provide an accurate correspondence therebetween.

An example of such an arrangement is shown in FIG. 9 where visible light emitters 66 on the underside of a sensor bar 16D are aligned with and placed between optical triangulation emitter-receiver 68 of a type described in the cross referenced co-pending application or other types of height or thickness sensors. It would also be possible to use visible light in the optical contour measuring sensors 68 themselves therein to project the readily seen narrow band of visible light onto the item 14.

The invention claimed is:

1. An apparatus for displaying a numeric value corresponding to the volume of a segment of an item comprising:

a support surface for supporting said item;

a sensor support able to be stroked over said item to be positioned above any selected section of said item from any other position along said item;

a visual indicator providing a visual indication extending across said item of each successive section of said item corresponding to each successive position of said sensor support assumed in being stroked along said item, said visual indicator comprising a visible light projector arrangement carried by said sensor support projecting a visible elongated pattern of light onto and extending in a direction lying across said item at each corresponding section of said item over which said sensor support is located in each successive position of said sensor support in being moved along said item;

a detector arrangement which generates signals corresponding to the movement of said sensor support in being stroked over said item from said any other position to be positioned above said any selected section;

a sensor arrangement generating signals corresponding to the contour of the segment of said item stroked over by said sensor support as said sensor support is moved to be positioned above said any selected section of said item;

a signal processor responsive to said signals generated by said detector arrangement and said sensor arrangement to compute therefrom the volume of the selected segment of said item defined by movement of said sensor support in moving over said item from said other position to a position over said selected section of said item; and, a display displaying a numeric value corresponding to said volume of said selected segment of said item as computed by said signal processor with said sensor support in position above said any selected section of said item with said visual indicator at the same time providing a visual indication on said item of said selected section as said display displays said numeric volume.

2. A method of displaying a numeric value corresponding to the volume of any selected segment of an item comprising:

disposing said item on a support surface;

displacing a sensor bar from a reference position over any section of said item to a position over a selected other section of said item, the portion of said item between said reference position section and said selected other section defining a selected segment thereof;

providing a visual reference extending across said item and visually indicating each section of said item corresponding to each position of said sensor bar assumed in being displaced along said item, including projecting an elongated pattern of visible light extending in a direction lying across said item to visually indicate each successive section of said item passing below said sensor bar at each position assumed by said sensor bar along said item, said elongated pattern of visual light and numeric display being positioned to both be visible to an observer at the same time;

generating sensor signals corresponding to the contour of said selected segment of said item as said sensor bar is displaced to said selected other section;

detecting displacement of said sensor bar required to reach said selected other section of said item, and generating corresponding detector signals;

processing said generated sensor and detector signals to calculate therefrom the volume of said selected segment of said item;

deriving a numeric value corresponding to the calculated volume of said selected segment; and, displaying a numeric value thereby derived with said sensor bar in position over said selected other section of said item while providing said visual indication of said selected other section.

3. An apparatus for displaying a numeric value corresponding to the volume of any selected segment of an item comprising:

a support surface for supporting said item;

a sensor arrangement which is able to be manually selectively positioned aligned over any selected section of said item to be able to define a selected segment of said item extending between any two sections of said item;

a visual indicator providing a visual indication on each successive section of said item corresponding to each successive position of said sensor arrangement over said item as said sensor arrangement is moved along said item, said visual indicator comprising a visible light projector arrangement carried by said sensor support projecting a visible elongated pattern of light onto and extending in a direction lying across said item at each corresponding section of said item over which said sensor support is located in each successive position of said sensor support in being moved along said item;

a detector arrangement which generates signals corresponding to the displacement of said sensor arrangement from a position at which said sensor arrangement is aligned with a selected starting section of said item to a position aligned with any selected other section of said item;

said sensor arrangement generating signals corresponding to the contour of said selected segment of said item extending between said selected starting section and said selected other section;

a signal processor receiving said signals generated by said detector arrangement and said sensor arrangement and computing therefrom the volume of said selected segment of said item defined between said selected starting section of said item and said selected other section of said item; and, a display enabling displaying a numeric value corresponding to said volume of the selected segment of said item as computed by said signal processor with said sensor arrangement at a position aligned with said selected other section of said item.

4. A method of displaying a numeric value corresponding to the volume of any selected segment of an item resting on a support surface comprising displacing an indicator along said item from a selected reference position with respect to said item while providing a visual indication extending across each successive section of said item corresponding to each relative position of said indicator in being displaced along said item by projecting an elongated pattern of visible light in a direction lying across said item from said indicator to thereby provide said visual indication on each successive section of said item corresponding to the successive positions of said indicator along said item; detecting the displacement of said indicator from said selected reference position; sensing the contour of said item passed over by said indicator in being displaced along said item; and, calculating the volume of a selected segment of said item between said selected reference position and a selected other position with respect to said item from said detected displacement and sensed item segment contour; and, displaying a numeric value corresponding to said calculated volume of said selected segment after said indicator is in said selected other position.

5. The method according to claim 4 wherein said sensing of said contour of said item is done by one or more optical sensors utilizing visible light which also project a visible light pattern onto said item to provide said visual indication.

6. The method according to claim 4 further including placing an elongated element immediately over said item to visibly indicate said selected reference position and leaving said element in position over said item as said indicator is displaced to said selected other position to thereby provide a visual indication of said selected segment of said item.

* * * * *